July 17, 1956

W. M. DAVIS, SR 2,754,858

CURVE CUTTING AND WORK GUIDING APPARATUS

Filed Sept. 7, 1954

WALTER M. DAVIS, SR.
INVENTOR.

BY  Eaton + Bell

ATTORNEYS.

July 17, 1956
W. M. DAVIS, SR
2,754,858
CURVE CUTTING AND WORK GUIDING APPARATUS
Filed Sept. 7, 1954
5 Sheets-Sheet 2
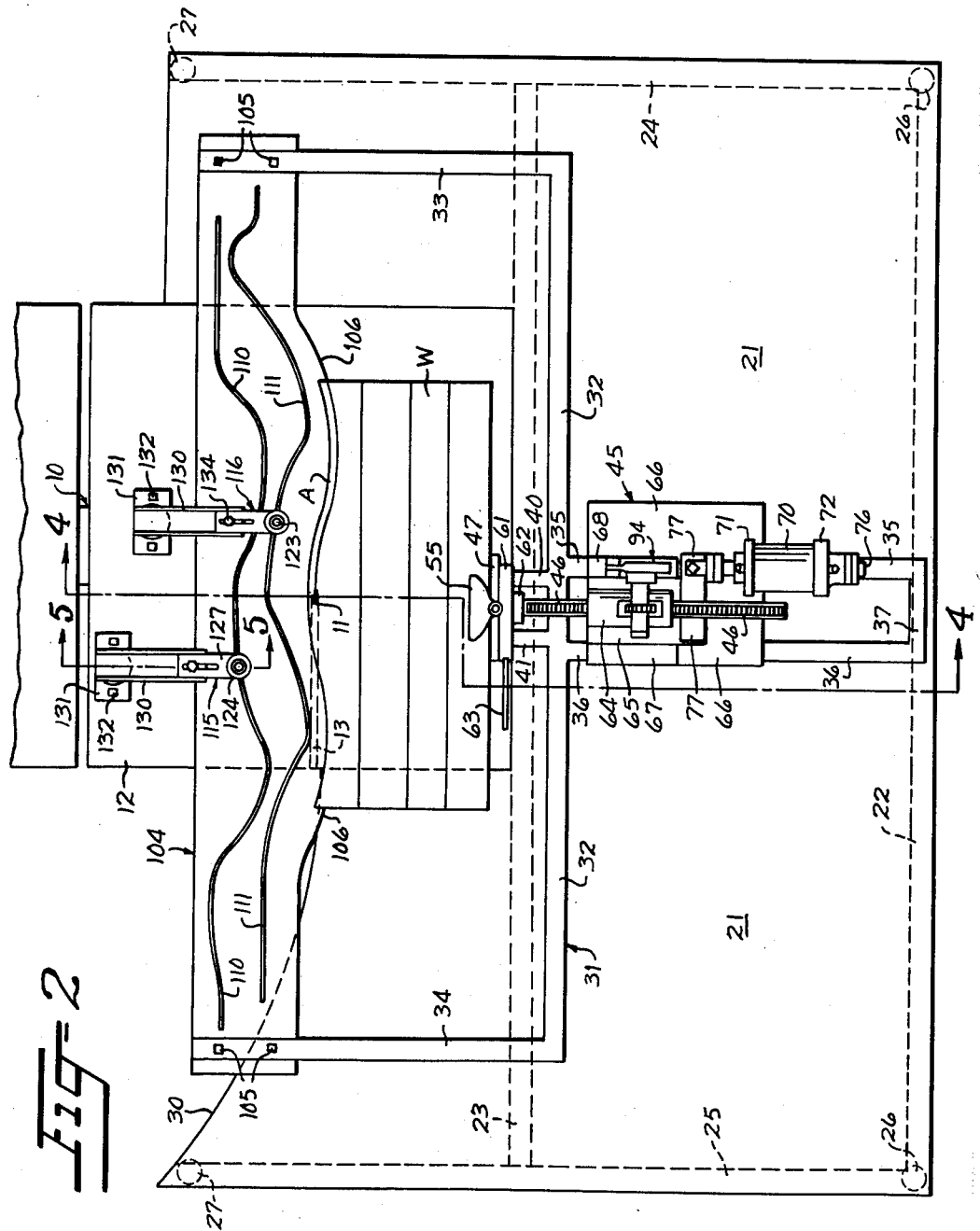
INVENTOR:
WALTER M. DAVIS, SR.
BY Eaton + Bell
ATTORNEYS.

July 17, 1956 W. M. DAVIS, SR 2,754,858
CURVE CUTTING AND WORK GUIDING APPARATUS
Filed Sept. 7, 1954 5 Sheets-Sheet 3
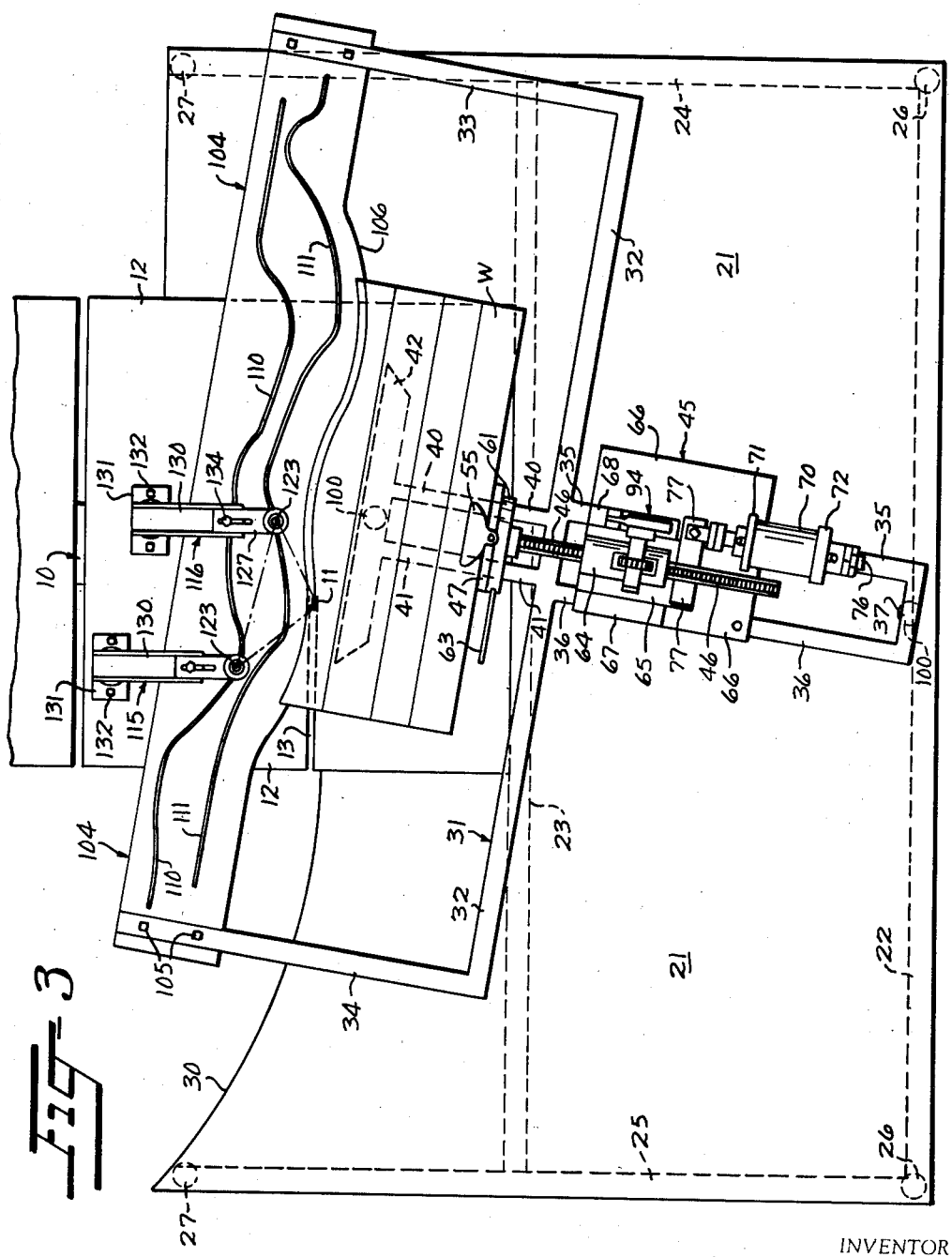
INVENTOR:
WALTER M. DAVIS, SR.
BY Eaton + Bell
ATTORNEYS.

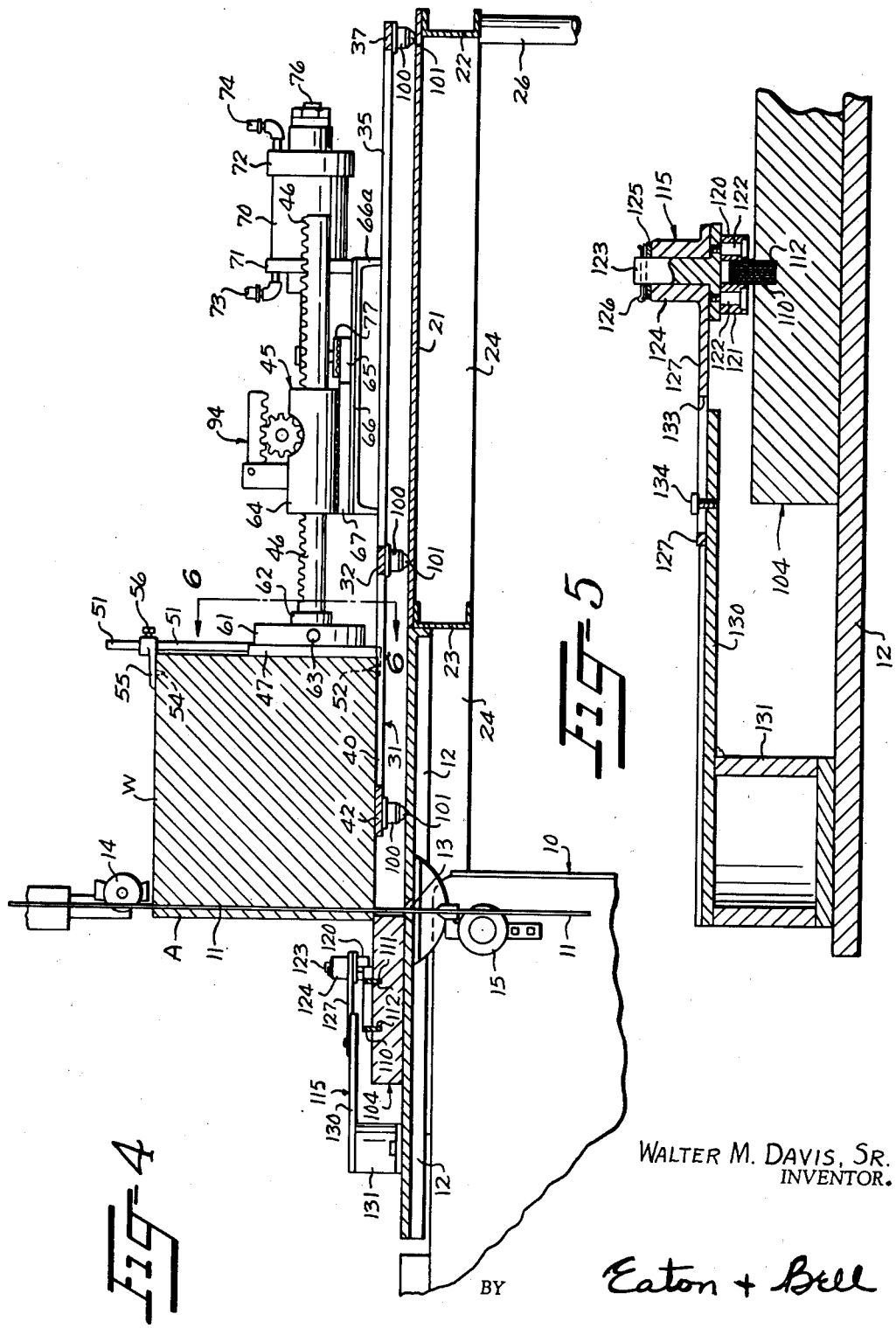

July 17, 1956  W. M. DAVIS, SR  2,754,858
CURVE CUTTING AND WORK GUIDING APPARATUS
Filed Sept. 7, 1954   5 Sheets-Sheet 5
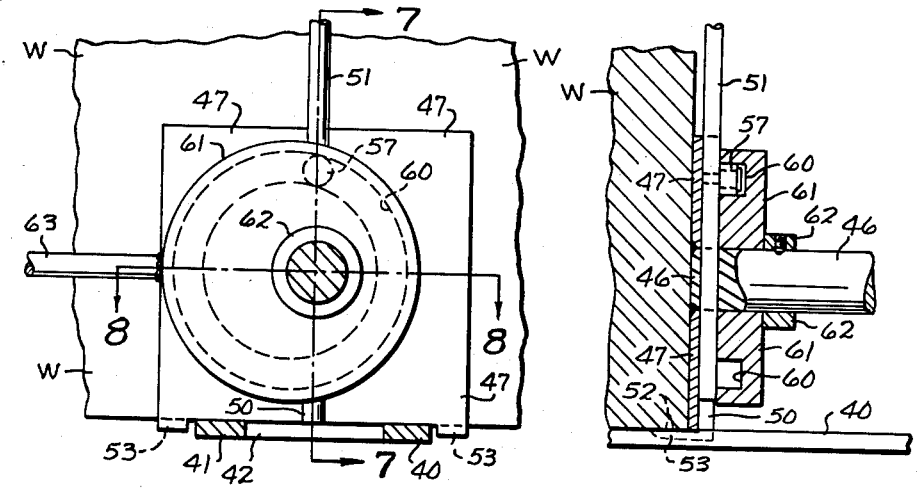
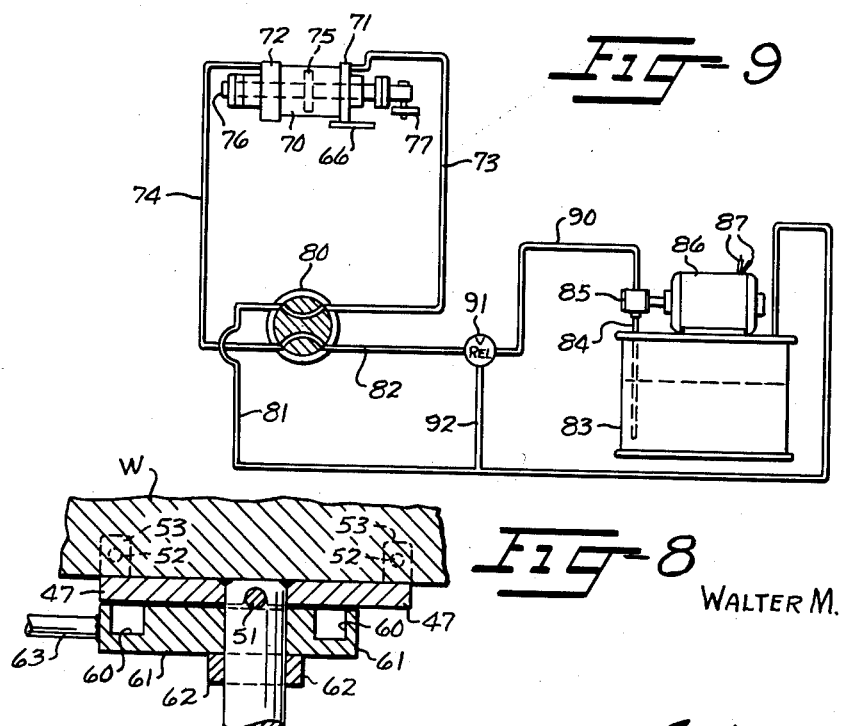
WALTER M. DAVIS, SR.
INVENTOR.
BY  Eaton + Bell
ATTORNEYS.

United States Patent Office 2,754,858
Patented July 17, 1956

2,754,858

CURVE CUTTING AND WORK GUIDING APPARATUS

Walter M. Davis, Sr., Lenoir, N. C.

Application September 7, 1954, Serial No. 454,540

4 Claims. (Cl. 143—171)

This invention relates to cutting machinery such as bandsaws machines, scroll cutting machines and the like and, more especially, to novel means for guiding a workpiece in a predetermined path of irregular configuration for successively cutting a plurality of identical pieces or articles from the workpiece. The present invention is particularly concerned with improvements in a curve cutting sawing apparatus of the character disclosed in my prior Patent No. 2,678,070 dated May 11, 1954.

It is an object of this invention to provide an improved means for positively controlling the path of travel of a workpiece-supporting table in the course of manual or mechanical movement thereof transversely of the direction of movement of a continuously moving cutting band or blade for successively cutting pieces or articles of predetermined circuitous or sinuous configuration from a workpiece.

It is another object of this invention to provide a pattern table or workpiece-supporting table adapted to be moved upon a table top carried by a conventional bandsaw machine and wherein the pattern table is provided with a pair of spaced irregularly-shaped and relatively thin tracks which project upwardly from the pattern table at points rearwardly of the bandsaw relative to the workpiece. The configuration of the tracks vary and the tracks are engaged by respective pairs of rollers or spaced projections depending from arms which extend rearwardly beyond the path of movement of the pattern table and are secured to the bandsaw table, the pairs of rollers engaging the two tracks being spaced laterally from each other and the two tracks being formed in accordance with lines generated about the front and rear edges of the cutting blade.

Some of the objects of the invention having been stated, other objects will appear as the description proceeds, when taken in connection with the accompanying drawings, in which—

Figure 2 is a top plan view of the structure shown in Figure 1, but omitting the parts of the bandsaw machine disposed above the level of the upper surface of the workpiece;

Figure 3 is a view similar to Figure 2, but showing the workpiece and the guiding and supporting means therefor in different positions from those shown in Figure 2;

Figure 4 is an enlarged vertical sectional view taken substantially along line 4—4 in Figure 2;

Figure 5 is an enlarged fragmentary vertical sectional view taken substantially along line 5—5 in Figure 2;

Figure 6 is an enlarged elevation, partially in section, taken looking substantially along line 6—6 in Figure 4 and showing the means for securing the workpiece to the means for advancing and retracting the workpiece relative to the cutter blade;

Figure 7 is a fragmentary vertical sectional view taken substantially along line 7—7 in Figure 6;

Figure 8 is a fragmentary sectional plan view taken substantially along line 8—8 in Figure 6;

Figure 9 is a schematic diagram of the fluid pressure system for the apparatus.

Figure 1:
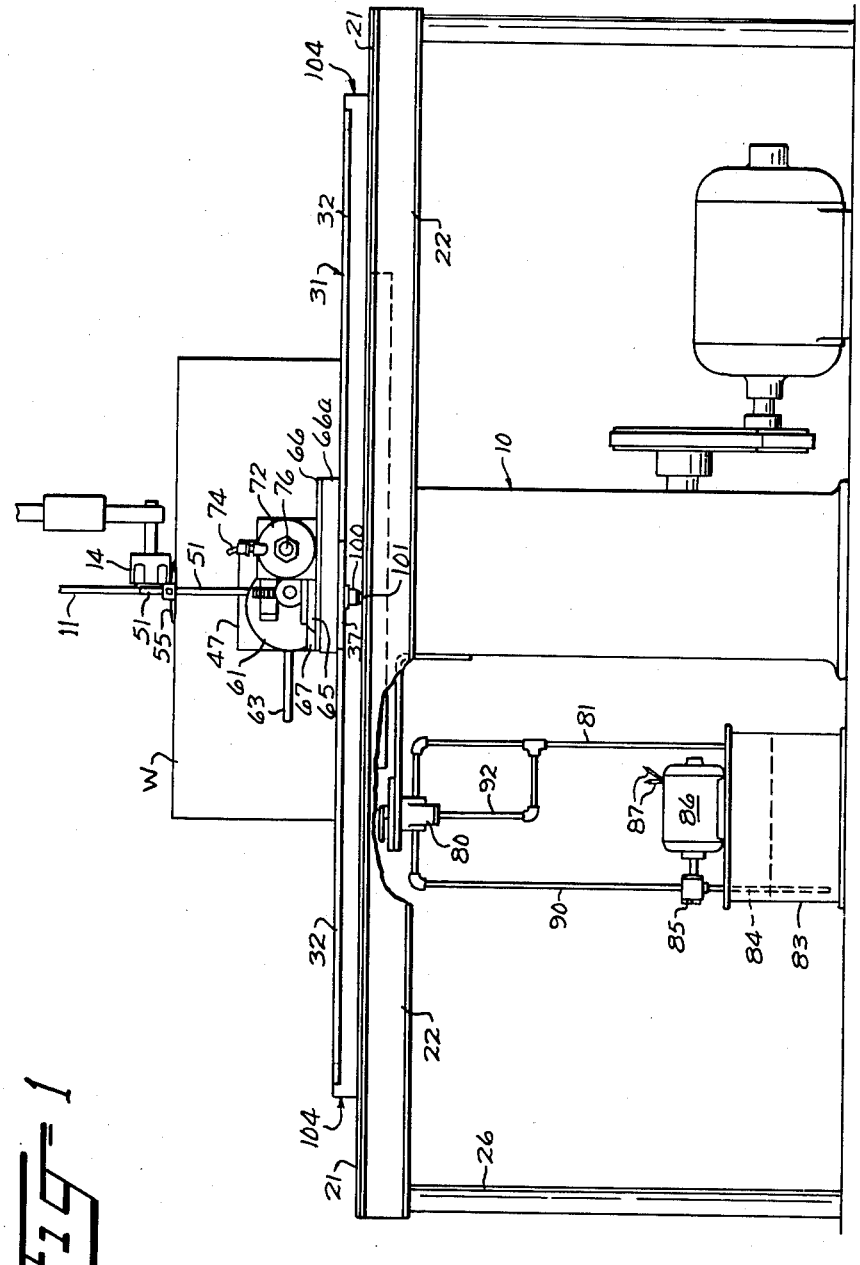
Figure 1 is a front elevation of the lower portion of a bandsaw machine showing the improved workpiece guiding apparatus mounted thereon.

Referring more specifically to the drawings, the numeral 10 broadly designates a follow frame of a bandsaw machine or the like having means, not shown, for supporting and imparting movement to a bandsaw or endless cutter blade 11 in the usual manner. The bandsaw machine may be of substantially the type disclosed in my prior Patent 2,678,070 dated May 11, 1954, and therefore, a detailed description thereof is deemed unnecessary.

The frame 10 supports a conventional bandsaw table or platform 12 having a slot or opening 13 (Figures 2, 3, 4) therein through which the bandsaw or endless cutter blade 11 passes, the cutter blade 11 being guided by suitable upper and lower guide means 14 and 15 carried by the frame 10. It will be noted that the upper guide means for the cutter blade 11 is spaced substantially above the table 12 and the lower guide means 15 is spaced closely beneath the table 12.

In order to support the pattern platform and the workpiece support or framework, an auxiliary table or extension platform is provided which includes a relatively thin table top 21, preferably of sheet metal, which is substantially rectangular in shape but is cut away to fit around the conventional bandsaw machine table 12 and is supported on the same level as the conventional bandsaw machine table by means of front and rear transverse frame members 22, 23 and side frame members 24, 25, which frame members are suitably interconnected.

Opposite ends of the front frame member 22 are supported on legs 26 and the rear ends of the side frame members 24, 25, which extend rearwardly beyond the rear frame member 23, are supported on corresponding legs 27 (Figures 1, 2 and 4). It is preferable that the left-hand rear portion of the auxiliary table top 21 is cut away, as at 30, to provide access to the slot 13 in the bandsaw table 12 for replacing the bandsaw blade 11, when desired, and to also provide space for the operator during operation of the machine.

The workpiece-supporting platform or table is broadly designated at 31 and is shown in the form of a frame which is substantially rectangular in plan and provided with a relatively narrow extension on the forward portion thereof for supporting the means for feeding or advancing and retracting the workpiece. The workpiece-supporting table or platform 31 is formed from relatively thin and relatively narrow front and side frame member 32, 33, 34 which are preferably relatively thin, relatively narrow and made from a rigid material such as strap metal in order to minimize the weight of the workpiece-supporting table or platform 31 while providing a structure of sufficient strength to amply support the weight of the workpiece W and the workpiece advancing apparatus to be later described.

The framework 31 also includes a forward extension comprising a pair of closely spaced forwardly projecting frame members 35, 36 whose rear ends are connected to the front transverse frame member 32 and whose front ends are bridged by a frame member 37. Projecting rearwardly from the center of the front transverse frame member 32 is another pair of closely spaced relatively narrow frame members 40, 41 whose rear ends terminate substantially short of the rear ends of the side frame members 33, 34 and forwardly of the bandsaw blade 11 and which are connected to the medial portion of an intermediate transverse frame member 42. The frame members 40, 41, 42 support the workpiece W so the workpiece may be slid upon the upper surfaces thereof as it is advanced and retracted relative to the bandsaw blade 11 at the end of each inactive and active stroke of the workpiece and the workpiece-supporting table or platform 31.

The frame members 35, 36 and 37 form an extension to the front portion of the frame 31 and support an advancing and retracting mechanism broadly designated at 45 and which may be of substantially the same construction as that disclosed in said Patent No. 2,678,070. Since the advancing and retracting mechanism 45 for the workpiece W is quite similar to the advancing and retracting mechanism disclosed in said patent, only so much of the advancing and retracting mechanism 45 will be described as is necessary to clarify its operation with respect to the improved pattern mechanism to be later described.

The workpiece feeding or advancing and retracting mechanism 45 includes a plunger or shaft shown in the form of a rack 46 (Figures 1, 2, 3, 4, 6, 7 and 8) whose rear end is fixed in or to a plate 47 having a vertically extending groove 50 in the central portion thereof in which a workpiece clamping shaft or rod 51 is mounted for vertical sliding movement. The workpiece W is held against the rear surface of the plate 47 by means of a pair of lower upwardly projecting pointed pins 52 suitably secured to or integral with, respective rearwardly projecting ears 53 on the lower edge of the plate 47 which are disposed astride the outer edges of the frame members 40, 41.

The workpiece W is also held against the rear surface of the plate 47 by means of an upper pointed pin or member 54 projecting downwardly from a clamp arm 55 which extends forwardly and is adjustably secured on the upper portion of the vertically disposed clamping rod 51, as by a set screw 56 (Figures 1, 2, 3 and 4). In order to force the workpiece W downwardly to impale the same on the pointed pins 52 and to also cause the upper pointed pin 54 to penetrate the upper portion of the workpiece W, the lower medial portion of the vertically movable clamping rod 51 has a cam follower 57 thereon which is shown in the form of a roller (Figures 6 and 7) and is engaged by the walls of a circular groove 60 in an eccentric face cam 61 loosely mounted on the shaft or rack 46 closely adjacent the front surface of the plate 47 and in off-center relation to the axis of the rack 46.

The rear surface of the face cam 61 is maintained in close proximity to or in sliding engagement with the front surface of the clamping rod 51 by means of a collar 62 fixed on the rack 46. The face cam 61 has a rod 63 extending radially therefrom which serves as a handle to permit the operator to impart rotational movement to the face cam 61 for correspondingly raising and lowering the clamping rod 51, the clamp member 55 and the upper pointed pin 54. As shown in Figure 6, when the clamp arm 55 is in snug engagement with the upper surface of workpiece W, the follower 57 is disposed in off-center relation to the circular groove 60, since the follower 57 remains in vertical alinement with the rack 46 at all times and, thus, the follower locks the shaft or clamping rod 51 and the clamp arm 55 in clamping position.

The rack 46 is mounted for horizontal and longitudinal sliding movement in an elongated tubular guide member 64 (Figures 2, 3, and 4) suitably secured, as by welding, to the upper surface of a guide plate 65. The guide plate 65 is mounted for forward and rearward sliding movement on a base plate 66 carried by a channel bar 66a which is suitably secured, as by welding, to the forwardly projecting frame members 35, 36 heretofore described. The guide plate 65 is also guided between guideways or gibs 67, 68 fixed on the base plate 66.

In order to effect reciprocatory movement to the slide 65 and the tubular guide member 64, a horizontally disposed ram comprising a hydraulic or pneumatic double-action cylinder 70 is provided, opposite ends of which are closed by a cylinder head 71 and cylinder base 72 (Figure 4). It will be observed in Figure 4 that the cylinder head 71 is suitably secured to the base plate 66 and opposite ends of the cylinder 70 have flexible pipes or conduits 73, 74 communicatively connected thereto. The cylinder 70 has a piston 75 therein (Figure 9) to which the medial portion of a piston rod 76 is secured and the rear end of the piston rod 76 is suitably connected to a bar 77 projecting laterally from one side of the guide 65, as best shown in Figures 3 and 4.

Referring to Figure 9, it will be observed that the pipes or conduits 73, 74 extend from the cylinder 70 and are connected to a suitable four-way valve 80 which may be manually operated or which may be operated automatically such as by the means shown in said Patent No. 2,678,070. Also connected to the valve 80 are pipes or conduits 81, 82. The end of the pipe 81 remote from valve 80 is connected to a suitable compression tank or reservoir 83 which also has a pipe or conduit 84 therein which extends to a suitable hydraulic pump 85 driven by an electric motor 86. Wires 87 lead from the electric motor to a suitable source of electrical energy, not shown.

The side of the pump 85 remote from pipe 84 has a pipe or conduit 90 leading therefrom to one side of a suitable pressure relief valve 91 to which the pipe 82 and a branch pipe or conduit 92 are also connected. The end of the pipe 92 remote from the relief valve 91 is connected intermediate the ends of the pipe 81. The valve 91 is of a type which normally permits fluid to flow from pipe 90 into pipe 82. However, upon the occurrence of excessive pressure in the fluid pressure system, the valve 91 permits fluid in pipe 90 to return to tank 83 through the pipes 92 and 81. It is apparent that, by manipulating the valve 80, fluid pressure may be alternately introduced into opposite ends of the cylinder 70 as it returns to the reservoir 83 from the other end of the cylinder 70 and, in so doing, forward or rearward movement is imparted to the rack 46.

The effective stroke of the rack 46 may be varied in any desired manner, such as by the means disclosed in said patent to determine the thickness of the article A to be cut from the workpiece W upon each active stroke thereof. The workpiece feeding and retracting apparatus or mechanism 45 also has suitable means for limiting both forward and rearward movement of the rack 46, such means being generally designated at 94 and, since the means 94 does not necessarily constitute a part of the present invention and is clearly disclosed in said patent, a further detailed description thereof is deemed unnecessary.

Now, in order that the workpiece-supporting platform or frame 31 may be easily moved over the upper surfaces of the bandsaw table 12 and the table top 21, it will be observed in Figure 4 that the lower surface of the frame 31 has a plurality of spaced blocks or socket members 100 depending therefrom in which suitable rollers or balls 101 are mounted and which balls 101 bear against the upper surfaces of the bandsaw table 12 and the table top 21 for supporting the frame or workpiece-supporting table 31.

The improved pattern and workpiece guiding apparatus comprises an elongated pattern plate or board 104 which is suitably secured at opposite ends thereof to the rear portions of the side frame members 33, 34 of the workpiece supporting frame 31 as by screws 105. Opposite ends of the pattern plate or board 104 are preferably recessed for reception of the side frame members 33, 34 of the frame 31 so the upper surfaces of the frame members 40, 41 and 42 are substantially flush with or on the same level as the upper surface of the pattern plate or board 104, since the pattern board or pattern plate 104 rests against the upper surface of the bandsaw table and the table top 21 and is moved is sliding engagement therewith during operation of the machine.

It will be observed in Figures 2 and 3 that the front edge of the pattern board or pattern plate 104 is preferably shaped at the central portion thereof, as at 106, to conform substantially to the shape or contour of each successive article A to be cut from the workpiece W. Also, the edge 106 of the pattern plate or pattern board 104 remains in contact with or in close proximity to the rear surface of the cutter blade 11 throughout each active and inactive stroke of the work supporting table 31 and the pattern board 104 so each article A being cut from the workpiece W is supported on the pattern board or pattern table 104.

Projecting upwardly from the pattern plate or pattern board 104 is a pair of forwardly and rearwardly spaced irregular rear and front tracks 110, 111 (Figures 2 and 3) which are necessarily relatively thin and should be made from a rigid durable material such as metal. In view of the necessary sinuosity of the guide tracks or pattern tracks 110, 111 in order to facilitate the guiding of the workpiece W for cutting curved articles or pieces therefrom of predetermined configuration, each of the pattern tracks 110, 111 is preferably made from a plurality of juxtaposed metallic strips which, individually, are a fraction of the total thickness of each of the pattern tracks 110, 111. For example, the total thickness of each of the pattern tracks 110, 111 is preferably one fourth inch and the pattern plate or pattern board 104 is provided with a groove 112 (Figures 4 and 5) in the upper surface thereof for each of the pattern tracks 110, 111 which groove 112 is of slightly less width than the overall width of the corresponding pattern track and, in this instance, a plurality of metallic strips of a thickness of approximately one thirty-second of an inch are pressed or otherwise forced into the corresponding groove 112 to form each of the pattern tracks 110, 111 so the pattern tracks 110, 111 are held in the corresponding groove 112 by frictional engagement therewith.

It will be noted that the shape of each of the pattern tracks 110, 111 differs from that of the other in accordance with the relative positions of a pair of stationary pattern guides broadly designated at 115 and 116 which are spaced rearwardly of the cutter blade or bandsaw blade 11 and which are also spaced astride the cutting and trailing edges of the cutter blade 11. Since both of the stationary pattern guides 115, 116 are identical, except for their positions relative to the cutter blade 11, only the stationary pattern guide 115 will be described in detail and like parts associated with the stationary guide 116 will bear the same reference characters.

As best shown in Figure 5, opposite sides of the track 110, or the front and rear surfaces of the track 110, are engaged by a pair of projections shown in the form of rollers 120, 121 each of which is rotatably mounted on a shoulder screw 122 whose reduced upper end is threadably embedded in the enlarged lower end of a vertically disposed shaft 123 loosely mounted in an adjustable bracket 124. The shaft 123 is supported in the bracket 124 by means of a washer 125 and a cotter key 126. Thus, the rollers or projections 120, 121 may oscillate about a common axis as such movement is effected thereto by the variations in the contour of the pattern track 110 during the course of reciprocatory movement of the pattern track with the pattern board or pattern plate 104.

The bracket 124 has a stem 127 thereon which is guided for adjustment in a channel-shaped arm 130 which extends rearwardly beyond the rear edge of the pattern board or pattern plate 104 and has a downwardly projecting portion 131 thereon. The downwardly projecting portion 131 of the arm 130 is suitably secured to the rear portion of the bandsaw table 12, as by screws 132 (Figures 2 and 3). In order to permit forward and rearward adjustment of each of the stationary pattern guides 115, 116, it will be observed that the stem 127 of each of the brackets 124 has a longitudinally extending slot 133 therein which is penetrated by a screw 134 for securing the corresponding bracket 124 to the channel-shaped arm 130 between the flanges thereof.

As indicated in dash-and-dot lines in Figure 3, it will be noted that the cutting and trailing edges of the cutter blade 11 and the axes of the shafts 123 of the two stationary guides 115, 116 define the four corners of a trapezium. It follows, therefore, that the grooves 112 for the tracks 110, 111 may be accurately determined by first forming the edge 106 on the pattern plate 104 in the same shape as that in which the articles A are to be subsequently formed. Thereafter, a suitable laying-out tool having a small section of a bandsaw blade or other element of similar size positioned on one edge thereof and a pair of pencil points or scribing points positioned relative to said piece of a bandsaw blade in accordance with the positions of the two shafts 123 of the stationary pattern guides 115, 116 relative to the bandsaw blade or cutter blade 11 in Figures 2 and 3 may be placed upon the pattern board and the said piece of bandsaw blade may then be slid in engagement with the surface 106 and the pencil points carried by the laying-out tool will then form lines along the pattern board or pattern plate conforming to the varying angles that the workpiece support and pattern plate must be positioned in order that the constantly moving and varying points of tangency of the front surface or edge 106 on the pattern board or pattern plate 104 will move parallel to the flat rear surface of the cutting blade 11. The lines thus formed or scribed by the pencils heretofore described are then used as guides in cutting each of the grooves 112, which grooves may be cut on a router machine or the like.

Although it is desirable that the curved front edge 106 is retained on the pattern plate 104, it is apparent that the front edge of the pattern plate may be straight or its configuration may be changed after the lines for the grooves 112 have been laid out.

The workpiece-supporting table or platform embodied in the frame 31 and the pattern plate or pattern board 104 with the workpiece W thereon may be reciprocated from side to side either manually or by means such as that shown by said patent and, at the end of each active stroke thereof from left to right in Figures 2 and 3, the valve 80 may be adjusted to cause the workpiece W to move outwardly or forwardly whereupon the workpiece-supporting platform or table embodied in frame 31 and the pattern board 104 may be moved in the opposite direction or from right to left in Figures 2 and 3. The valve 80 (Figure 9) may then be adjusted to impart an active stroke to the rack 46 and to thereby advance the workpiece W a predetermined distance so that a succeeding article A of predetermined thickness may subsequently be cut from the workpiece W as the frame 31 and the pattern board 104 are again moved from left to right in an active stroke thereof. Thus, successive articles A of identical configuration may be cut from the workpiece W.

It is thus seen that I have provided an improved pattern mechanism for use with bandsaw machines and the like wherein the path of travel of the workpiece is determined by a pair of irregularly-shaped tracks positioned on the pattern board and which tracks are engaged by a pair of laterally spaced stationary or fixed guide members and wherein the stationary guide members and the cutting and trailing edges of the cutter blade define the corners of a trapezium, the configuration of the pattern tracks conforming to constantly varying lines of tangency produced by movement of the cutter blade along a predetermined circuitous or sinuous path.

It might be stated that, in the event that it is necessary to replace the endless cutter blade 11, it is merely necessary to remove the screws 105 from the left-hand end of the pattern board or pattern plate 104 and to then remove the corresponding frame member 34 from the pattern board 104 to permit the cutter blade to be passed therebetween.

In the drawings and specification there has been set forth a preferred embodiment of the invention and, although specific terms are employed, they are used in a generic and descriptive sense only, and not for purposes

I claim:

1. Apparatus for guiding a workpiece on a curve-cutting machine having a vertically movable flat cutter blade provided with flat front and rear surfaces and cutting and trailing edges, and said machine also having a table thereon; said apparatus comprising an elongated pattern plate movable upon said table adjacent the rear surface of said blade, front and rear, spaced, generally parallel, relatively thin, sinuous and rigid pattern tracks projecting upwardly from said pattern plate, means disposed adjacent the front surface of the blade for supporting the workpiece in fixed relation to said pattern plate during movement thereof, front and rear stationary guides disposed above the pattern plate, rearwardly of the rear surface of the blade and being spaced laterally from imaginary lines extending rearwardly at right angles to the flat rear surface of the blade and from the respective cutting and trailing edges of said blade, a pair of downwardly extending closely spaced projections on each of said front and rear guides and engaging opposite sides of the respective front and rear tracks, and the relative curvature of the tracks and the relative positions of the front and rear guides with respect to the blade being such as to cause the workpiece to move along a predetermined sinuous path.

2. A structure according to claim 1 having means for adjusting the front and rear stationary guides forwardly and rearwardly relative to said blade and independently of each other.

3. A structure according to claim 1 wherein said front and rear stationary guides also include respective first and second forwardly and rearwardly extending brackets overlying said pattern plate and from which the respective pairs of said projections depend, and means attached to said table on which said brackets are mounted for adjustment forwardly and rearwardly relative to the blade.

4. A structure according to claim 1 wherein each of said stationary guides also comprises a bracket having a forward portion thereof overlying the corresponding track and from which the corresponding pair of said projections depend, an arm spaced above said table and on which a rear portion of the bracket is mounted for forward and rearward adjustment, said arm having a downwardly projecting portion thereon spaced rearwardly of the rear edge of the pattern plate, and means securing said downwardly projecting portion of the arm to the table of the cutting machine whereby the pair of projections on the front guide and the pair of projections on the rear guide may be adjusted forwardly and rearwardly relative to each other, relative to the blade and relative to the pattern plate.

References Cited in the file of this patent

UNITED STATES PATENTS

| | | |
|---|---|---|
| 82,171 | Staats | Sept. 15, 1868 |
| 106,006 | Watkins | Aug. 2, 1870 |
| 273,000 | Wrigley | Feb. 27, 1883 |
| 874,434 | Porttens | Dec. 24, 1907 |
| 1,001,338 | Bernstein | Aug. 22, 1911 |
| 2,548,698 | Benge | Apr. 10, 1951 |
| 2,678,070 | Davis | May 11, 1954 |

FOREIGN PATENTS

| | | |
|---|---|---|
| 156,339 | Germany | Nov. 28, 1904 |